Nov. 3, 1942. D. P. FAULK 2,300,539
ELECTRIC DISCHARGE APPARATUS
Filed May 10, 1941 2 Sheets-Sheet 2
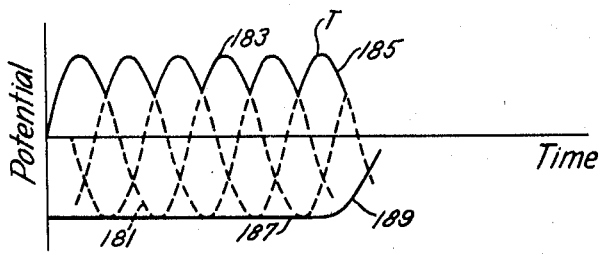
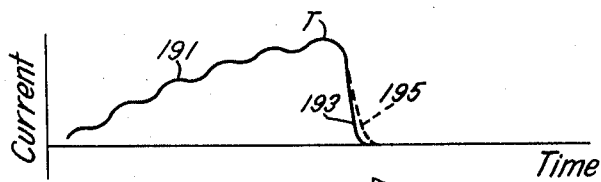
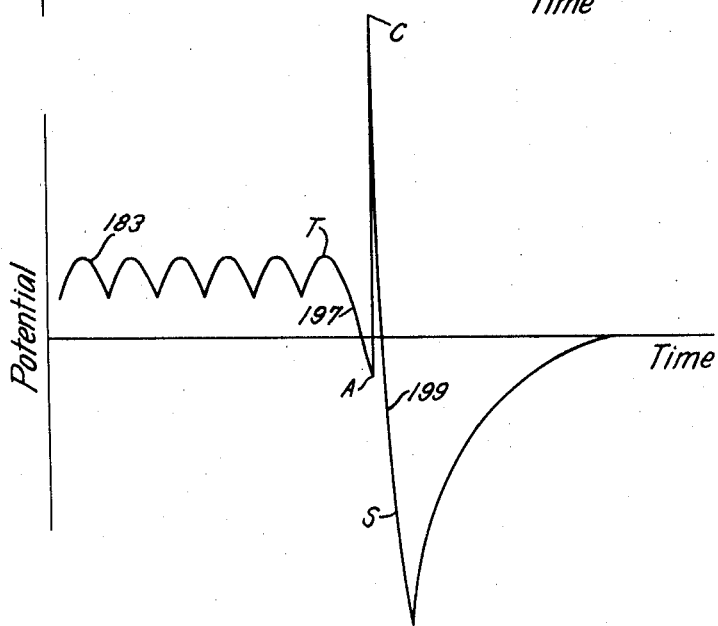
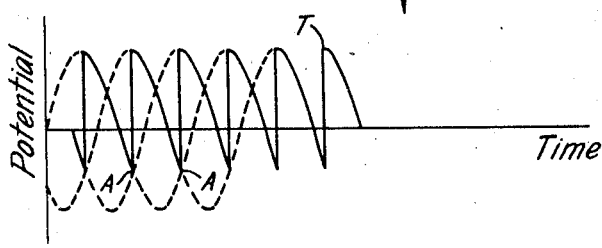
WITNESSES:
INVENTOR
Donald P. Faulk.
BY
ATTORNEY Patented Nov. 3, 1942

2,300,539

UNITED STATES PATENT OFFICE 2,300,539

ELECTRIC DISCHARGE APPARATUS

Donald P. Faulk, Pittsburgh, Pa., assignor to Westinghouse Electric & Manufacturing Company, East Pittsburgh, Pa., a corporation of Pennsylvania Application May 10, 1941, Serial No. 392,866

16 Claims. (Cl. 250—27)

My invention relates to electric discharge apparatus, and has particular relation to welding apparatus.

The present application is a continuation-in-part of my copending application, Serial No. 374,662, filed January 16, 1941, and assigned to Westinghouse Electric & Manufacturing Company.

In my copending application is described welding apparatus in which current is supplied to the primary of the welding transformer through electric discharge valves. The primary current is increased gradually until it reaches a predetermined value and is then interrupted by impressing a blocking potential across the supply valves through an auxiliary electric discharge valve. Once the current flow is interrupted, another electric discharge valve, connected in parallel with the primary, is rendered conductive and the primary current arising from the decay of flux in the transformer flows through the parallel valve. The conductivity of the auxiliary valve and the parallel valve is controlled from the primary. The latter is connected in the control circuit of the auxiliary and parallel valves in such a manner that the reversal of the polarity of the primary potential, which occurs when the current flow to the primary is being interrupted, renders the valves conductive. The parallel valve may be an ignitron connected across the terminals of the primary through a substantial resistance which may be varied to regulate the rate of decay of flux in the welding transformer. The rate of decay of the flux which produces the current flow through the shunt circuit determines the rate of decay of the flux which produces the current flow through the material to be welded.

The apparatus illustrated in the above-mentioned copending application, has a supply valve, preferably an ignitron, connected between each phase of a source of polyphase potential and the primary. The ignitrons are so arranged that each of them is in its turn rendered conductive as the potential of its corresponding phase of the source exceeds the potential of the other phases. Thus, at the moment when the current to the primary is interrupted and the blocking potential is impressed across the supply ignitrons, only one ignitron is conductive. The latter ignitron is rendered non-conductive by the blocking potential which is impressed from a capacitor on the ignitron through an auxiliary valve, also preferably an ignitron. The blocking potential de-ionizes the supply ignitron and renderers it non-conductive.

While the apparatus described in my copending application on the whole operates satisfactorily, difficulties sometimes arise. During the course of an extended welding operation, it, on occasions, happens that for certain of the contemplated welds the welding current fails to flow. Sometimes current tends to flow between the welding electrodes when no weld is to be produced. For many purposes, the operation need not be entirely flawless and the erratic operation is not serious. However, my invention is often used for welding aircraft parts and in the aircraft industry it is desirable that the faulty operation be suppressed.

Another problem which arises in connection with the prior welding apparatus concerns the provision of different voltages for the welding transformer. It is desirable in certain welding operations to impress a lower voltage on the primary of the welding transformer than is ordinarily used. In the system described in my copending application, no satisfactory method is provided for producing a satisfactory welding operation with a lower voltage impressed on the primary through the supply valves from the same potential source.

It is, accordingly, an object of my invention to provide a welding system of the type described which is reliable and consistent in operation.

Another object of my invention is to provide an improved electric discharge valve circuit for controlling current flow through a highly reactive impedance.

A further object of my invention is to provide an improved control circuit for an electric discharge valve.

Still another object of my invention is to provide a welding system of the type described in which the same interrupter circuit may be used with different potentials impressed upon the welding transformer.

My invention arises from the realization, on the basis of extensive experimental investigations, that the apparatus disclosed in my copending application has certain properties which give rise to the faulty operation. The latter apparatus operates erratically because occasionally the supply of current from the valves to the primary of the welding transformer is not interrupted by the blocking condenser. I have found that the capacitor voltage which is impressed to de-ionize the conductive supply valve sometimes causes the valve to backfire. Because of the backfire the valve is heated and the ionization is maintained so that after the capacitor is discharged, the valve continues to pass current from the supply transformer.

In accordance with my invention, a resistor is connected in the capacitor discharge circuits to avoid faulty operation as a result of backfire. At the precise instant when the auxiliary ignitron becomes conductive, the full capacitor voltage less the arc drop through the auxiliary ignitron is applied to the supply valve. However, as current begins to flow from the capacitor, the potential drop through the resistor reduces the voltage applied to the supply valve. The initial capacitor potential is sufficiently high to deionize the valve, but it does not persist at the high magnitude for a sufficiently long time interval to produce backfire.

The apparatus disclosed in my copending application sometimes fails because the blocking capacitor prematurely extinguishes the supply valves. The supply valves are designed to become conductive in succession at the instant when the potential of each of the phases of the source exceeds the potential of the other phases. I found, however, that on occasions there is a delay in the transfer of conductivity from one valve to another. If the firing of a supply valve is delayed sufficiently, the voltage which controls the operation of the auxiliary valve, attains the magnitude necessary to effect interruption of supply current. The interruption then occurs before the supply current reaches the desired value.

In accordance with my invention, failure of the system resulting from delayed firing of the supply valves is avoided by interposing a capacitor in the control circuit of the auxiliary valve. The capacitor is sufficiently large to introduce a delay in the control circuit of the auxiliary valve to prevent it from becoming conductive on the decrease of the potential impressed through the valves to a predetermined value. The capacitor is disconnected from the control circuit to permit the current interruption to take place when the predetermined current value is reached.

The presence of the capacitor in the control circuit of the auxiliary valve not only is a safeguard against accidental failure to fire of a supply valve, but also makes possible the introduction of a useful deliberate delay in the firing of the supply valves. The voltage impressed on the welding transformer may be varied by adjusting the firing circuits of the supply valves. To reduce the voltage to a low value, each of the supply valves should be fired a substantial time interval after its phase potential has exceeded the preceding phase potential. During this time interval, the voltage impressed in the control circuit of the auxiliary valve is propitious for firing the latter, but the deliberate delay introduced in the control circuit of the auxiliary valve prevents the premature firing.

The delay capacitor also serves to prevent accidental discharge of the blocking capacitor.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 2 is a graph showing the relationship between the voltages in Fig. 1;

Fig. 3 is a graph of the current through the primary of the welding transformer plotted against time;

Fig. 4 is a graph showing the voltage across the primary of the welding transformer throughout a welding operation; and Fig. 5 is a graph illustrating the voltage impressed on the primary when firing of the supply valves is delayed.

Figure 1:
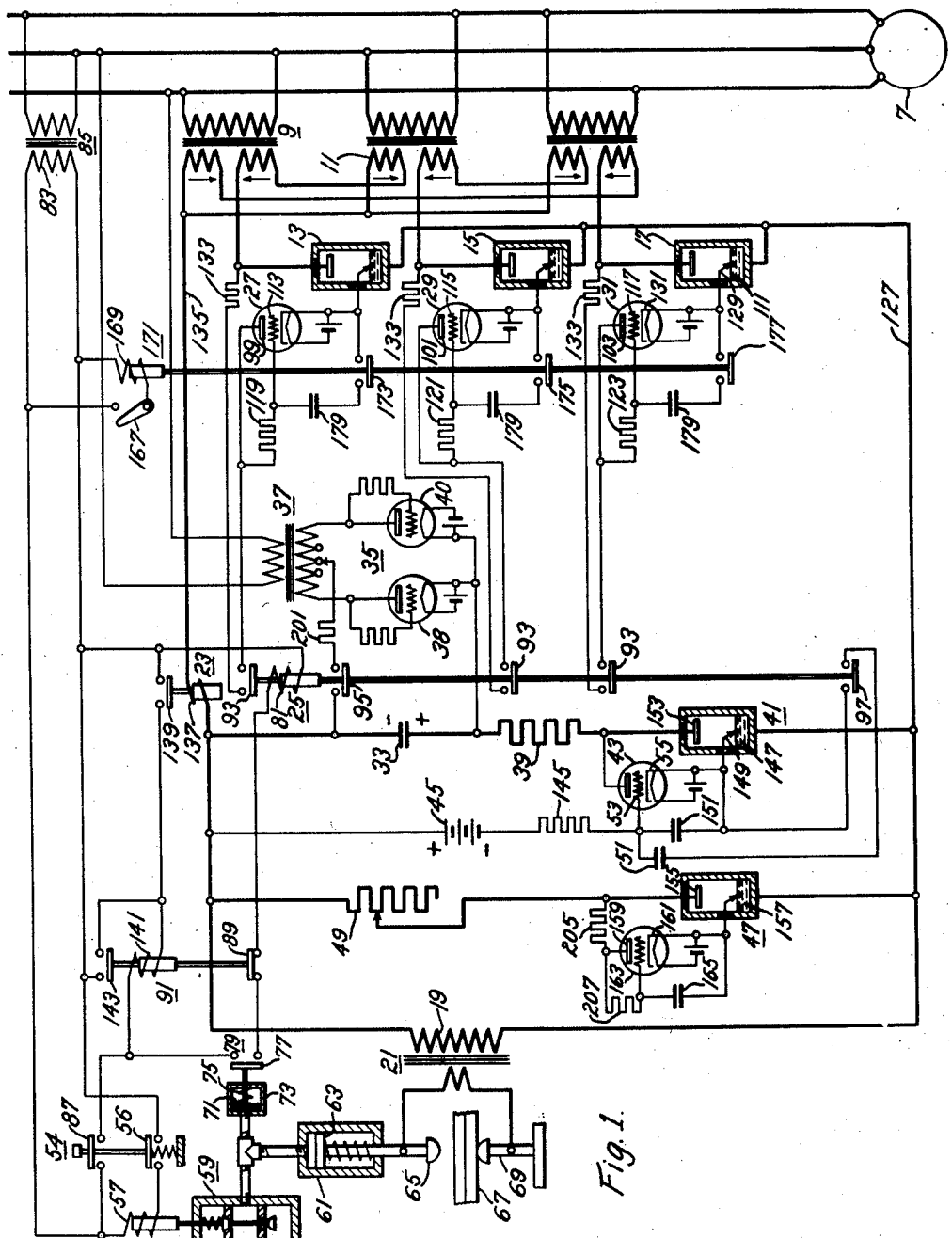
Figure 1 is a diagrammatic view showing a preferred embodiment of my invention.

The apparatus shown in Fig. 1 comprises a polyphase source 7 from which a supply transformer 9 is energized. The secondary 11 of the transformer is connected in zig-zag and electric discharge valves 13, 15 and 17, preferably ignitrons, are connected between the external terminals of each of the windings of the transformer secondary 11 and the primary 19 of a welding transformer 21. In accordance with the broader aspects of my invention, the electric discharge valves 13 to 17 need not necessarily be ignitrons. They may be mercury pool devices of other types and in the event that the primary current is relatively small, they may also be discharge devices of the hot cathode type.

The magnitude to which the current flowing through the primary 19 of the welding transformer 21 rises is controlled by a current relay 23. When the current reaches the desired value, the relay 23 operates to effect deenergization of an auxiliary relay 25 which breaks the anode circuits of thyratrons or igniter valves 27, 29, 31 of the supply ignitrons 13, 15, and 17, respectively. The igniter valves 27, 29 and 31 are thus prevented from firing, but the primary current is not interrupted. The supply ignitrons which happen to be non-conductive when the relay 25 is operated will thus be prevented from becoming conductive in their turn as their anode potentials exceed the anode potentials impressed on the other ignitrons. However, the supply ignitron which is conductive when the relay is operated remains conductive even under the influence of the back potential impressed from the supply transformer 21 by reason of the high reactance of the welding transformer.

The current flow through the conductive ignitron is interrupted by a blocking capacitor 33. The capacitor is initially charged to a polarity such as to oppose the current flow through the supply ignitrons by a full-wave rectifier 35 using thyratrons 38 and 40 supplied from an auxiliary transformer 37. The potential to which the capacitor is charged is varied by adjusting the center tap of the transformer in relation to the current value at which the relay 23 is operated. The capacitor 33 is connected across the ignitrons 13 to 17, through a resistor 39 and an auxiliary valve 41, preferably an ignitron. Firing current is supplied to the auxiliary ignitron 41 through a thyratron 43. A biasing potential 45 is interposed in the control circuit of the thyratron 43 in series with the primary potential of the welding transformer 21 on the one hand and the potential impressed through the conductive ignitron on the other hand. The net potential impressed in the control circuit or the thyratron depends on the magnitude of the three potentials and the impedance in their associated circuits. When the firing valves for the supply ignitrons are rendered non-conductive, the potential impressed across the ignitron which is last conducting current decreases and the potential across the primary, which is originally negative, increases (becomes progressively less negative and then positive) correspondingly. Eventually, the potentials attain such a value that their net effect is to counteract the biasing potential 45 in the control circuit of the thyratron 43 from which the auxiliary ignitron 41 is fired. The ignitron 41 becomes conductive connecting the blocking capacitor 33 and resistor 39 across the conductive supply ignitron. At the precise instant of firing of auxiliary ignitron 41 the full capacitor voltage is applied to the conductive supply ignitron to deionize it. Immediately current starts to flow in the capacitor discharge circuit, and the potential drop across the resistor 39 reduces the voltage and prevents backfire.

After the current flow from the supply transformer 9 has been interrupted, a shunting discharge valve 47, which may also be an ignitron, is rendered conductive. The current arising from the decay of flux in the welding transformer is then discharged through the shunting ignitron 47 and through a variable resistor 49 in series therewith. The resistor 49 may be set at a proper value to correspond to the desired rate of decay.

While a potential is being impressed on the welding transformer primary 19 through the supply valves 13, 15 and 17, a capacitor 51 is connected between the grid 53 and cathode 55 of the thyratron 43 through which the auxiliary ignitron 41 is fired, by current relay 25. The capacitor 51 prevents the thyratron 43 from being fired by voltage variations before the predetermined value of supply current is reached. The supply current relay 23 effects deenergization of relay 25 to disconnect the capacitor 51 from the control circuit and thus permit firing of the thyratron 43 to render the auxiliary ignitron 41 conductive at the proper time.

With the apparatus in the condition illustrated in the drawings, a welding operation may be initiated by closing a manual controller such as a foot switch 54. The lower movable contactor 56 of the controller 54 closes, completing a circuit through the energizing coil 57 of a fluid pressure valve 59. The valve operates, permitting a fluid under pressure to flow into a piston chamber 61 and to move a piston 63. The piston 63 carries a movable welding electrode 65 and when it is actuated, the movable electrode is urged into engagement with the material 67 to be welded which is held in engagement with the fixed welding electrode 69. The fluid continues to flow, increasing the pressure on the piston 63 and exerting pressure on another piston 71 in an auxiliary chamber 73 in communication with the electrode piston chamber 61. The latter piston moves against the action of a spring 75 and closes the movable contactor 77 of a pressure switch 79 when the pressure on the movable welding electrode has reached the desired magnitude.

The exciting coil 81 of the auxiliary relay 25 is now energized in a circuit extending from the upper terminal of the secondary 83 of an auxiliary transformer 85, through the manual controller contactor 87, the pressure switch 79, the normally closed contactor 89 of a second auxiliary relay 91, the exciting coil of the relay 25, to the lower terminal of the secondary 83. The auxiliary relay 25 is thus energized and its movable contactors 93, 95, and 97 close. Contactors 93 close the anode circuits of the thyratrons 27, 29 and 31 for the supply ignitrons. The contactor 95 closes the charging circuit for the blocking capacitor 33. The remaining contactor 97 places a capacitor 51 across the grid 53 and cathode 55 of the thyratron 43 which controls firing of the auxiliary valve 41.

Grid resistors 119, 121, and 123 are connected between the anodes 99, 101, 103, respectively, and the corresponding grids 113, 115 and 117 of the firing thyratrons 27, 29 and 31. The value of the grid resistors is so chosen that a positive grid-cathode potential is established to fire each thyratron as its corresponding phase potential exceeds the other phase potentials.

The firing circuit for the supply ignitron 17 extends from the terminal of one of the windings from which the ignitron is supplied through the corresponding current limiting resistor 133, the anode 103 and cathode 131 of the thyratron 31, the igniter 129 and cathode 111 of the ignitron conductor 127, the primary 19, to the neutral conductor 135. The firing circuits for other supply ignitrons may be correspondingly traced.

With the contactors 93, 95 and 97 of the auxiliary relay 25 closed, firing current will flow through the corresponding firing circuits as the potential of each of the phases of the source exceeds the potential of the other phases. The corresponding supply ignitrons are thus rendered conductive and current flows through the primary 19 and through the exciting coil 137 of the current relay 23. Because of the high reactance of the welding transformer 21, the current through the primary 19 rises gradually. When this current reaches a predetermined value, the current relay 23 is actuated and its contactor 139 closes. A circuit is now completed which extends from the upper terminal of the secondary 83 of the auxiliary transformer 85, through contactor 87 of manual controller 54, the exciting coil 141 of the auxiliary relay 91, the contactor 139 of the current relay 23, to the lower terminal of the secondary. The auxiliary relay 91 closes its contactor 143 to establish a holding circuit therefor and opens its normally closed contactor 89, breaking the circuit through exciting coil 81 of the other auxiliary relay 25. As a result, the contactors 93, 95 and 97 open.

With the opening of contactors 93 of relay 25, the anode circuits of the firing valves 27, 29 and 31 for the supply ignitrons 13, 15 and 17 are opened to prevent further operation of the firing valves. The contactor 95 opens the charging circuit of the capacitor 33 and the contactor 97 disconnects the capacitor 51 from across the grid and cathode of the thyratron 43 controlling the conductivity of the auxiliary valve 41.

One of the supply ignitrons is conductive and the others are non-conductive when the firing valves anode circuits are opened. As the operation progresses, the non-conductive ignitrons do not become conductive in their turn because their firing valves are non-conductive. The conductive ignitron continues to carrying current at the potential of the phase from which it is supplied decreases, by reason of the reactive impedance in its anode-cathode circuit. As the phase potential decreases the potential across the primary of the welding transformer correspondingly increases so that the net potential across the conductive ignitron remains positive.

The conducting ignitron is rendered non-conductive by impressing the potential of the blocking capacitor 33 in its anode circuit. As an initial step in the sequence of operations which lead to this event, the charging circuit for the blocking capacitor 33 is opened by the contactor 95 of the auxiliary relay 25. In addition, the capacitor 51 across the grid and cathode of the thyratron 43 controlling the conductivity of the auxiliary ignitron 41 is disconnected by the contactor 97 of the auxiliary relay 25.

While the capacitor 51 remains connected across the grid and cathode of the thyratron 43, firing of the auxiliary valve is prevented. The supply voltage impressed across the circuit extending through the cathode 147 of ignitron 41, contactor 97, capacitor 51, resistor 145 and bias potential source 45, charges the capacitor with its negative plate connected to the grid 53 of thyratron 43. If a potential variation across the reactor as the impressed phase potential is varied causes the biasing potential to be counteracted before the predetermined supply current value is reached, the thyratron is not rendered conductive. Instead the voltage is used to charge the capacitor 51 in the opposite direction. The size of capacitor 51 is such that the time required to change it from its negative value to a positive value by the potential available is greater than the time necessary for the phase potential to continue its cycle and return to its former condition in which the biasing potential is not counteracted. It is, therefore, necessary to disconnect capacitor 51 from the control circuit of the thyratron 43 before the auxiliary valve 41 can be rendered conductive.

The control circuit for the thyratron 43 through which the auxiliary ignitron 41 is fired extends from its control electrode 53 through a grid resistor 145 to the biasing potential 45 thence through the parallel network consisting of the primary 19 of the welding transformer 21 on one side and the windings of the supply secondary 11 corresponding to the conductive supply ignitron on the other side; and finally through the cathode 147 and igniter 149 of the auxiliary ignitron 41 to the cathode 55 of the thyratron. A small capacitor 151 is permanently connected across the grid and cathode of thyratron 43 to set the critical potential thereof. As the potential across the primary of the welding transformer rises as the impressed potential decreases, the bias potential in the control circuit of the firing thyratron 43 is counteracted until the critical potential of the thyratron is exceeded. The ignitron 41 then becomes conductive, connecting the blocking capacitor 33 through the resistor 39 across the conductive supply ignitron. The blocking capacitor 33 is initially charged so that its positive plate is connected to the anode 153 of the auxiliary ignitron 41 through the resistor 39, and its negative plate is connected to the neutral conductor 135 of the supply transformer 9. The cathode 147 of the auxiliary ignitron 41 is connected to the common cathode conductor 127 of the supply ignitrons 13, 15 and 17. The charged capacitor 33 is thus connected across the conductive supply ignitron in opposition to the current flow therethrough. The conductive supply ignitron is then forcibly de-ionized and rendered non-conductive.

The potential from the primary 19 of the welding transformer 21 is also impressed between the anode 155 and cathode 157 of the shunting ignitron 47, and between the anode 159 and cathode 161 of the firing thyratron 163 for the ignitron 47 through the variable resistor 49. A capacitor 165 is also connected between the grid and cathode of the firing thyratron 163 and its value with respect to grid resistor 207 is such that it will prevent the thyratron from firing until after the blocking capacitor 33 has discharged. When the firing thyratron 163 becomes operative, firing current is supplied through current limiting resistor 205 to the shunting ignitron 47 to render it conductive. The current arising from the decay in the flux in the welding transformer 21 is now discharged through the ignitron 47. The rate of decay may be adjusted by setting the variable resistor 49. By reason of the decay of flux in the welding transformer 21, welding current is induced in its secondary and the material 67 is welded.

The operation may be repeated by releasing the manual controller 54 and reclosing it. When the controller is released, the holding circuit for the auxiliary relay 91 opens, resetting the apparatus.

The variation of the potentials impressed across the control circuit of the thyratron 43 through which the firing current for the auxiliary ignitron 41 is transmitted, is illustrated in Fig. 2. In the graph shown in this figure, potential is plotted vertically and time horizontally. The sine curves 181 which are shown partly in full lines and partly in broken lines, represent the potential derived from the secondary 11 of the supply transformer 9. The full-line portions 183 of the curve represent the intervals during which the respective supply ignitrons 13, 15 and 17 are successively conductive. The potential impressed across the primary 19 of the welding transformer 21 through the supply ignitrons is represented by the full-line curve formed by combining the full-line portions 183 of the sine curves since the potential drop across a conductive ignitron is relatively small.

Assume that at some instant, represented by the point T, the current relay 23 operates and the firing valves for the supply ignitrons are rendered non-conductive. Only one of the supply ignitrons is then conductive and the potential which is impressed across the ignitrons from the source decreases, as illustrated by the full-line branch 185 of the sine curve on the extreme right of the graph. The potential across the primary 19 of the welding transformer 21 is represented by the full-line curve 187 in the lower quadrant of the graph. The potential remains substantially constant until the firing valves for the supply ignitrons are rendered non-conductive. At this point, the potential from the source decreases and the flux in the welding transformer tends to decay. The decay in flux causes an increase in the potential across the primary, as illustrated by the rising branch 189 of the curve 187 on the right. The net potential which is impressed in the control circuit of the thyratron 43 associated with the auxiliary ignitron 41 is dependent upon the values represented by the ordinates of the curves 183 and 187 and the impedances in circuit with the potentials. When the net potential impressed on the control circuit of the thyratron 43 is greater than the critical potential of the thyratron, the valve is rendered conductive and the auxiliary ignitron 41 is fired.

Fig. 3 is a reproduction of an oscillogram of the current flow through the primary 19 of the welding transformer 21. Current is plotted vertically and time horizontally. The rising wavy branch 191 of the graph corresponds to the increasing current in the primary of the welding transformer. At the instant T the current relay is energized and the firing valves for the supply ignitrons are rendered non-conductive. Thereafter, the flux in the transformer 21 decays and the resulting current is absorbed in the shunting ignitron 41. The full-line loop 193 on the extreme right represents the current flow for one setting of the resistor 49. If the amount of the resistance is increased, current flow may be represented by a curve corresponding to the broken line loop 195.

The potential across the blocking capacitor circuit and the shunting circuit throughout a welding operation is shown in Fig. 4. The potential is again plotted vertically and time horizontally. The potential impressed through the supply ignitrons 13, 15 and 17 is shown as at 183 at the beginning of the curve. At some instant represented by the point T, the current relay 23 operates, leaving only one of the ignitrons conductive. The potential which is impressed through the conductive supply ignitron from the source decreases along line 197 becoming negative, and when it reaches a value represented by point A, the auxiliary ignitron 41 is rendered conductive. The blocking capacitor 33 instantaneously impresses a voltage represented at C, discharges through the resistor 39, which causes the impressed voltage to drop sharply, and then charges in the opposite direction so that its potential takes the course of line 199. As the capacitor charges in the opposite direction, the potential again becomes negative and at some instant, as represented by the point S, the shunting ignitron will be fired, allowing the current produced by the decay in flux in the welding transformer to be discharged therethrough. The potential then approaches zero. If the resistor 39 were not in the capacitor discharge circuit, the potential would drop more slowly from the point C and the continued high potential would cause the conductive ignitron to backfire.

If it is desirable to impress a lower voltage upon the primary of the welding transformer, a manual switch 167 (Fig. 1) is closed energizing the exciting coil 169 of a relay 171 from the auxiliary transformer 85. The contactors 173, 175 and 177 of the relay 171 close inserting one of the capacitors 179 across the grid and cathode of each firing thyratron 27, 29, 31 for the supply valves. The capacitors 179 are chosen to effect the proper delay in the operation of the thyratrons for firing the supply valves to cause the desired lower potential to be impressed upon the primary.

In Fig. 5 is a graph similar to Fig. 2 in which is illustrated the potential impressed upon the welding transformer 21 when the firing of the supply ignitrons 13, 15 and 17 is intentionally delayed. From this graph, it can be seen that during the conductive period of each ignitron, as shown in full lines, the impressed potential decreases to a point A approximating that necessary to effect interruption of the supply current. Such interruption is, of course, prevented by the capacitor 51 connected to the control circuit of the auxiliary ignitron 41. When the supply current reaches the desired value at some instant T, the capacitor 51 is disconnected from the control circuit, permitting the auxiliary ignitron 41 to be rendered conductive in the usual manner.

It is to be understood that an accidental delay in the firing of a supply valve causes the potential impressed through the conductive valve to deviate from the course shown in Fig. 2 to follow a course similar to that shown in Fig. 5 until the transfer of conductivity is accomplished.

In the system in accordance with my invention, which has actually been constructed and tested, the supply ignitrons 13, 15 and 17 are Westinghouse WL-656 tubes and they are energized from a 220-volt source through a transformer 9 to impress a potential of 130 volts on the reactor. The firing thyratrons 27, 29 and 31 for the supply ignitrons are Westinghouse WL-632 tubes and the resistors 133 in the anode circuits thereof are 2 ohms. The blocking capacitor has a capacity of 600 microfarads and is charged from an adjustable 800 to 1800 volts alternating current source through a full wave thyratron rectifier 35 using Westinghouse KU-676 thyratrons 38 and 40 and a 50 ohm resistor 201. The auxiliary ignitron 41 and the shunting ignitron 47 are Westinghouse WL-651 tubes. The corresponding firing thyratrons 43 and 163 are Westinghouse WL-632 tubes. The resistor 49 connected in series with the shunting ignitron 47 is 2 to 15 ohms. The current limiting resistor 205 in the firing thyratron circuits for the shunting ignitron 47 is 5 ohms. The resistor 39 connected in series with the blocking capacitor 33 is 3 ohms. In the control circuit of the thyratron 43 through which the auxiliary ignitron 41 is fired, there is a biasing potential 45 of 45 volts and a .1 megohm grid resistor 145. The capacitor 51 connected by the contactor 97 across the grid and cathode of the thyratron 43 associated with the auxiliary ignitron 41 has a capacitor of .05 mf. The auxiliary capacitor 151 connected across the grid and cathode of the thyratron 43 has a capacitor of .0005 mf., while the capacitor 165 connected across the grid and cathode of the thyratron 163 associated with the shunting ignitron 47 has a capacitor of .002 mf. The grid resistors 119, 121, 123 for the firing thyratrons for the supply valves and the grid resistors 145 and 207 for thyratrons 43 and 163 are .5 megohm each. The capacitors 179 which are inserted across the grid and cathode of the firing thyratrons of the supply valves are each .005 mf. and delay firing of the supply valves to impress 88 volts on the welding transformer.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. For use in supplying a reactive load from a source of periodically pulsating potential, the combination comprising electric discharge valve means of the arc-like type connected between said source and said reactive load for impressing a potential across said reactive load to supply current therethrough, a normally non-conductive electric discharge device, a source of blocking potential connected in circuit with said valve means through said device, means for varying the potential impressed across said reactive load, means responsive to the variation in the potential across said reactive load as said impressed potential is varied for rendering said device conductive, thereby to apply said blocking potential to said valve means to interrupt said supply current, and means responsive to a flow of current from said blocking potential source for reducing the blocking potential applied to said valve means to prevent backfiring thereof.

2. For use in supplying a reactive load from a source of periodically pulsating potential, the combination comprising electric discharge valve means of the arc-like type connected between said source and said reactive load for impressing a potential across said reactive load to supply current therethrough, a normally non-conductive electric discharge device, a capacitor connected in circuit with said valve means through said device, means for maintaining said capacitor charged to a potential of a polarity such that the current flow through said valve means will be opposed thereby when said device is rendered conductive, means for varying the potential impressed across said reactive load, means responsive to the variation in potential across said reactive load as said impressed potential is varied for rendering said device conductive, and means responsive to a flow of current from said capacitor for reducing the opposing potential to prevent backfiring of said valve means.

3. For use in supplying a reactive load from a source of periodically pulsating potential, the combination comprising electric discharge valve means of the arc-like type connected between said source and said reactive load for impressing a potential across said reactive load to supply current therethrough, a normally non-conductive electric discharge device, a source of blocking potential connected in circuit with said valve means through said device for applying a voltage on said valve means to oppose flow of said supply current when said device becomes conductive, means for varying the potential impressed across said reactive load, means responsive to the variation in the potential across said reactive load as said impressed potential is varied for rendering said device conductive, and a resistor connected in circuit with said blocking potential source to effect reduction of the opposing voltage applied to said valve means as current flows from said blocking potential source and thereby prevent backfiring of said valve means.

4. For use in supplying a reactive load from a source of periodically pulsating potential, the combination comprising electric discharge valve means of the arc-like type connected between said source and said reactive load for impressing a potential across said reactive load to supply current therethrough, a normally non-conductive electric discharge device, a capacitor and a resistor connected in series with each other, said capacitor and resistor being connected in circuit with said valve means through said device, means for maintaining said capacitor charged to a potential of a polarity such that the current flow through said valve means will be opposed thereby when said device is rendered conductive, means for varying the potential impressed across said reactive load, and means responsive to the variation in the potential across said reactive load as said impresssed potential is varied for rendering said device conductive, said resistor acting upon flow of current from the capacitor to reduce said opposing voltage and thereby prevent backfiring of said valve means.

5. For use in supplying a reactive load from a source of polyphase potential, the combination comprising electric discharge valve means of the arc-like type connected between said source and said reactive load for impressing a potential across said reactive load to supply current therethrough, a normally non-conductive electric discharge device, a capacitor connected in circuit with said valve means through said device for applying a voltage on said valve means in opposition to said current when said device becomes conductive, means for interrupting the connections between certain phase terminals of said source and said reactive load to vary the potential impressed on said load, means responsive to the variation in the potential across said reactive load as said impressed potential is varied for rendering said device conductive, and means to effect reduction of the opposing voltage applied to said valve means when current flows from said capacitor and thereby prevent backfiring of said valve means.

6. For use in supplying a reactive load from a source of polyphase potential, the combination comprising electric discharge valve means of the arc-like type connected between each phase of said source and said reactive load, means for rendering the valve means connected to the phases of said source conductive in succession for impressing a potential across said reactive load to supply current therethrough, a normally non-conductive electric discharge device, a capacitor connected in circuit with said valve means through said device to apply a voltage on said valve means to oppose flow of said supply current when said device becomes conductive, means for preventing the valve means connected to certain of the phases of said source from becoming conductive in their turn to vary the potential impressed across said reactive load, means responsive to the variation in the potential across said reactive load as said impressed potential is varied for rendering said device conductive, and means connected in circuit with said capacitor for reducing the opposing voltage applied to said valve means when current flows from said capacitor to prevent backfiring of the conductive valve means.

7. In combination, a reactor, an electric discharge device in circuit with said reactor, means for impressing a potential across said reactor for supplying current thereto, means responsive to said current and operable at a predetermined value thereof to vary said potential, control means responsive to a variation of the potential across said reactor as said impressed potential is varied for controlling the conductivity of said device, means associated with said control means for preventing it from causing said device to become conductive, and means operable by said current responsive means to render said preventive means ineffective when said predetermined current value is reached.

8. In combination, a reactor, an electric discharge device in circuit with said reactor, means for impressing a potential across said reactor for supplying current thereto, means responsive to said current and operable at a predetermined value thereof to vary said potential, a circuit for controlling the conductivity of said device in response to variation of the potential across said reactor as said impressed potential is varied, charge storing means connected in said control circuit for preventing it from rendering said device conductive, and means operable by said current responsive means to disconnect said charge storing means when said predetermined current value is reached.

9. In combination, a reactor, an electric discharge device in circuit with said reactor, means for impressing a periodically pulsating potential across said reactor for supplying current thereto, means responsive to said current and operable at a predetermined value thereof to vary said potential, a circuit for controlling the conductivity of said device in response to variation in the polarity of the potential across said reactor as said impressed potential is varied, a capacitor connected in said control circuit for preventing it from rendering said device conductive for a predetermined time after a variation in said polarity, and means operable by said current responsive means to disconnect said capacitor when said predetermined current value is reached.

10. In combination, a reactor, an electric discharge device in circuit with said reactor, means for impressing a potential across said reactor for supplying current thereto including a source of polyphase potential, electric discharge valve means of the arc-like type connected between each of the phases of the source and the reactor, and means for rendering said valve means conductive in succession, means responsive to said supply current and operable at a predetermined value thereof to prevent the valve means connected to certain phases from becoming conductive in their turn to vary the potential impressed on said reactor, a circuit for controlling the conductivity of said device in response to variation of the potential across said reactor as said impressed voltage is varied, and means connected in said control circuit for preventing it from rendering said device conductive, said current responsive means including means for rendering the preventive means in said contol circuit ineffective when said predetermined current value is reached.

11. In combination, a source of polyphase potential, a reactor, electric discharge valve means of arc-like type connected between each phase of said source and said reactor, means for rendering the valve means connected to the phases of said source conductive in succession for impressing a potential across said reactor to supply current therethrough, said valve means being adjustable whereby a change in polarity of said impressed voltage during the conductive period of each valve means may be obtained, means for interrupting said supply current including a normally non-conductive electric discharge device and a capacitor connected in circuit with said valve means through said device, a control circuit for rendering said device conductive in response to a change in polarity across said reactor as the polarity of said impressed voltage is changed, means associated with said control circuit for preventing operation thereof, and means responsive to the flow of said supply current and operable when said current reaches a predetermined value to render said preventive means ineffective thereby to permit said device to become conductive.

12. For use in supplying a reactive load from a source of periodically pulsating potential, the combination comprising electric discharge valve means of the arc-like type connected between said source and said reactive load for impressing a potential across said reactive load to supply current therethrough, a normally non-conductive electric discharge device, a capacitor connected in circuit with said valve means through said device for applying a voltage on said valve means in opposition to the flow of said supply current when said device becomes conductive, supply current responsive means for varying the potential impressed across said reactive load, a control circuit for rendering said device conductive in response to a variation in the potential across sad reactive load as said impressed potential is varied, means connected in said control circuit for preventing the operation thereof, said current responsive means including means for rendering said preventtive means ineffective when said current reaches a predetermined value, and means responsive to a flow of current from said capacitor for reducing the opposing voltage applied to said valve means to prevent backfiring thereof.

13. For use in supplying a reactive load from a source of periodically pulsating potential, the combination comprising electric discharge valve means of the arc-like type connected between said source and said reactive load for impresing a potential across said reactive load to supply current therethrough, a normally non-conductive electric discharge device, a capacitor and a resistor connected in series with each other, said capacitor being connected in circuit with said valve means through said device for applying a voltage on said valve means to oppose said supply current when said device becomes conductive, supply current responsive means for varying the potential impressed across said reactive load, a circuit for controlling the conductivity of said device in response to variations in the potential across said reactive load as said impressed potential is varied, a capacitor connected in said control circuit for preventing said device from becoming conductive, and means actuated by said current responsive means for disconnecting said preventive capacitor from said control circuit when the supply current reaches a predetermined value, thereby permitting application of the opposing voltage, said resistor acting upon a flow of current from the first capacitor to reduce the opposing voltage applied to said valve means to prevent backfiring thereof.

14. For use in supplying a load from a source of potential, the combination comprising electric discharge valve means of the arc-like type connected between said source and load, means for initiating a flow of current through said valve means, an auxiliary source of blocking potential, means for connecting said auxiliary source in circuit with said valve means, the magnitude of the blocking potential available from said auxiliary source being sufficient to interrupt the flow of current through sad valve means, and a potential absorbing element in circuit with said auxiliary source for rapidly reducing the magnitude of the blocking potential applied to said valve means in response to a flow of current from said auxiliary source to prevent backfiring of said valve means.

15. For use in supplying a load from a source of potential, the combination comprising electric discharge valve means of the arc-like type connected between said source and load, means for initiating a flow of current through said valve means, a capacitor, means for charging said capacitor, means for connecting said capacitor in circuit with said valve means after it is charged, the polarity and magnitude of the potential charge on said capacitor being such as to interrupt the flow of current through said valve means when the capacitor is so connected, and a potential absorbing element in circuit with said capacitor for rapidly reducing the magnitude of the potential applied from said capacitor to said valve means in response to a flow of current from said capacitor to prevent backfiring of said valve means.

16. For use in supplying a load from a source of potential, the combination comprising electric discharge valve means of the arc-like type connected between said source and load, means for initiating a flow of current through said valve means, a capacitor, a resistor in series with said capacitor, means for charging said capactor, means for connecting said series-connected capacitor and resistor in circuit with said valve means after it is charged, the polarity and magnitude of the potential charge on said capacitor being such as to interrupt the flow of current through said valve means when the capacitor is connected in circuit therewith, said resistor acting upon a flow of current from said capacitor to reduce the magnitude of the potential applied from said capacitor to said valve means and thereby prevent backfiring of the valve means.

DONALD P. FAULK.

Disclaimer 2,300,539.—*Donald P. Faulk*, Pittsburgh, Pa. ELECTRIC DISCHARGE APPARATUS. Patent dated Nov. 3, 1942. Disclaimer filed Nov. 12, 1947, by the assignee, *Westinghouse Electric Corporation*, formerly Westinghouse Electric & Manufacturing Company.

Hereby enters this disclaimer to claims 14 and 15 of said specification.

[*Official Gazette December 30, 1947.*]